US011861842B2

(12) United States Patent
Ishikawa et al.

(10) Patent No.: US 11,861,842 B2
(45) Date of Patent: Jan. 2, 2024

(54) INFORMATION PROCESSING METHOD, PROGRAM, AND INFORMATION PROCESSING SYSTEM

(71) Applicant: Sony Semiconductor Solutions Corporation, Kanagawa (JP)

(72) Inventors: Hirotaka Ishikawa, Kanagawa (JP); Kanji Ogawa, Kanagawa (JP); Toshiyuki Yamauchi, Tokyo (JP); Akihiro Muto, Kanagawa (JP); Tomoki Oooka, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 435 days.

(21) Appl. No.: 17/267,963

(22) PCT Filed: Sep. 9, 2019

(86) PCT No.: PCT/JP2019/035395
§ 371 (c)(1),
(2) Date: Feb. 11, 2021

(87) PCT Pub. No.: WO2020/059564
PCT Pub. Date: Mar. 26, 2020

(65) Prior Publication Data
US 2021/0264608 A1 Aug. 26, 2021

(30) Foreign Application Priority Data
Sep. 18, 2018 (JP) ................................. 2018-174000

(51) Int. Cl.
*G06T 7/00* (2017.01)
*G06T 7/11* (2017.01)
(Continued)

(52) U.S. Cl.
CPC .................. *G06T 7/11* (2017.01); *G06N 3/08* (2013.01); *G06V 10/25* (2022.01);
(Continued)

(58) Field of Classification Search
CPC ............. G06T 7/11; G06T 2207/10024; G06T 2207/20081; G06T 2207/20084;
(Continued)

(56) References Cited

U.S. PATENT DOCUMENTS 10,157,331 B1 * 12/2018 Tang ...................... G06V 10/82
2017/0177965 A1 * 6/2017 Gordo Soldevila ... G06V 20/62
(Continued)

FOREIGN PATENT DOCUMENTS

JP   2014-59729 A    4/2014
JP   2014-123366 A   7/2014

OTHER PUBLICATIONS

International Search Report (PCT/ISA/210), International Application No. PCT/JP2019/035395, dated Nov. 13, 2019.
(Continued)

*Primary Examiner* — Van D Huynh
(74) *Attorney, Agent, or Firm* — Michael Best & Friedrich LLP

(57) ABSTRACT

A large number of highly accurate learning images are generated without bias at reduced costs. An information processing method for causing a processor to execute: automatically cropping a region including an object from a material image to generate an automatically cropped image; and performing learning related to detection of the object on the basis of the automatically cropped image, wherein the generating of the automatically cropped image further includes generating the automatically cropped image using an automatic cropping machine that is generated by learning on the basis of manually cropped images obtained by (Continued)

manually cropping a region including the object from the material image.

20 Claims, 13 Drawing Sheets

(51) Int. Cl.
*G06N 3/08* (2023.01)
*G06V 10/25* (2022.01)
*G06V 20/58* (2022.01)

(52) U.S. Cl.
CPC ........... *G06T 2207/10024* (2013.01); *G06T 2207/20081* (2013.01); *G06T 2207/20084* (2013.01); *G06T 2207/20132* (2013.01); *G06V 20/58* (2022.01)

(58) Field of Classification Search
CPC ............ G06T 2207/20132; G06N 3/08; G06N 3/045; G06N 3/088; G06N 20/00; G06V 10/25; G06V 20/58; G08G 1/16
See application file for complete search history.

(56) References Cited

U.S. PATENT DOCUMENTS

| | | | | |
|---|---|---|---|---|
| 2017/0371898 | A1* | 12/2017 | Sharma | G06V 20/20 |
| 2018/0181822 | A1* | 6/2018 | Chang | G06V 10/50 |
| 2018/0314878 | A1* | 11/2018 | Lee | G06V 40/175 |
| 2019/0034734 | A1* | 1/2019 | Yen | G06F 18/2413 |
| 2019/0325269 | A1* | 10/2019 | Bagherinezhad | G06F 18/241 |
| 2019/0347501 | A1* | 11/2019 | Kim | G06V 10/764 |
| 2019/0370532 | A1* | 12/2019 | Soni | H04N 23/80 |
| 2021/0201445 | A1* | 7/2021 | Kang | G06T 3/60 |
| 2022/0375259 | A1* | 11/2022 | Banerjee | G06V 40/45 |

OTHER PUBLICATIONS

Notification of Transmittal of the International Search Report and the Written Opinion of the International Searching Authority, or the Declaration (PCT/ISA/220), International Application No. PCT/JP2019/035395, dated Nov. 26, 2019.

Fujisanx, "Automated image data cropping using CNN and open CV," Hatena Blog, Jul. 3, 2017, pp. 1-11, [In Japanese], Retrieved on Nov. 12, 2019, Retrieved from the Internet: <URL: http://zero-ai.hatenablog.com/entry/2017/07/03/211918>.

Watanabe, N. et al., "Recognition of Car Images Using A Multi-Layered Neural Network," IEICE Technical Report, Mar. 25, 1994, vol. 93, No. 537, The Institute of Electronics, Information and Communication Engineers), pp. 191-198.

* cited by examiner

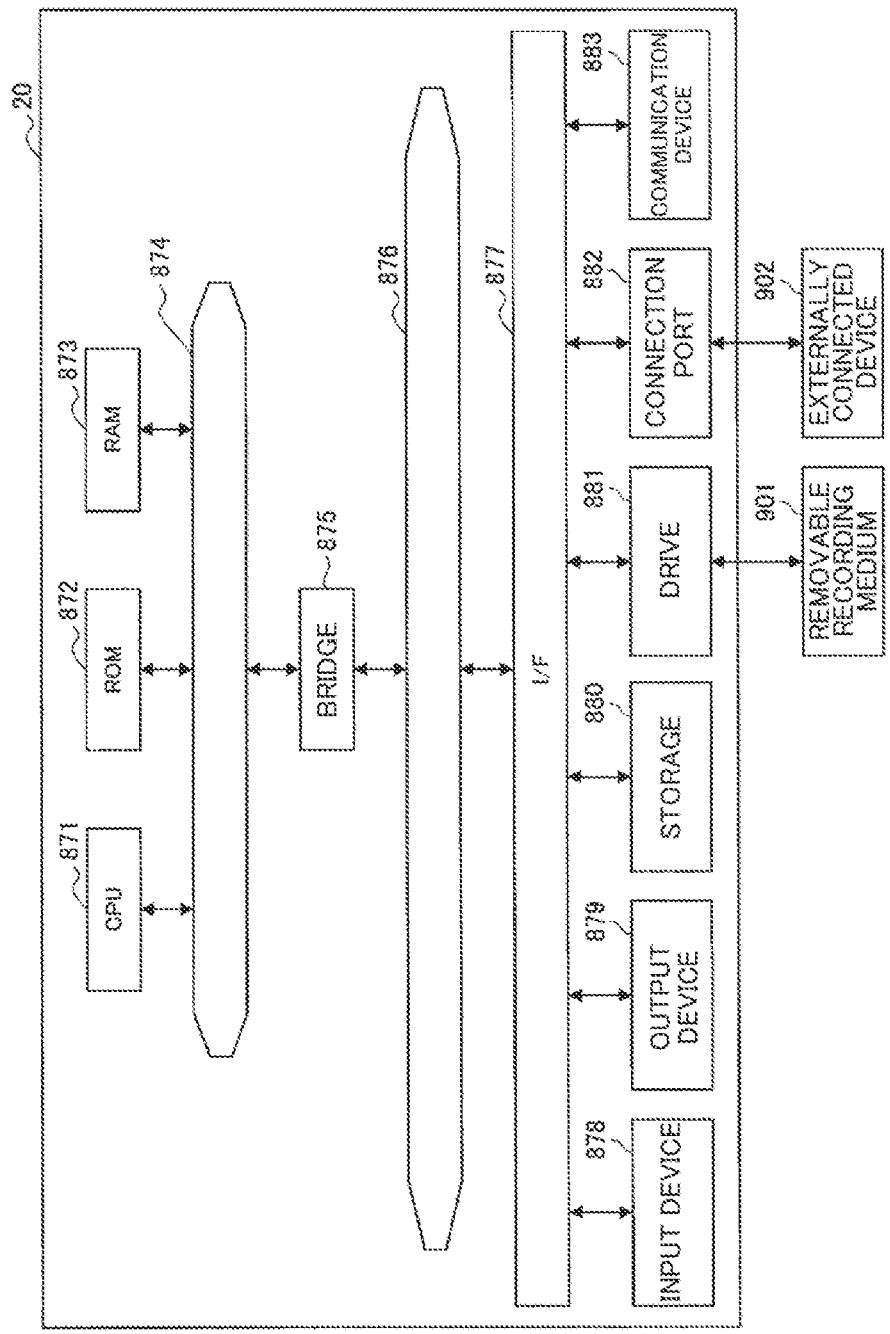

INFORMATION PROCESSING METHOD, PROGRAM, AND INFORMATION PROCESSING SYSTEM

TECHNICAL FIELD

The present disclosure relates to an information processing method, a program, and an information processing system.

BACKGROUND ART

In recent years, devices that detect an object in an image and perform an operation on the basis of the detection result have become widespread. In addition, a method of automatically generating a learning image used for constructing the detection function as described above has also been proposed. For example, PTL 1 discloses a technique for automatically cropping a learning image from a material image using a relatively simple non-pattern recognition system or pattern recognition system algorithm that does not require knowledge. Further, for example, PTL 2 discloses a technique of generating an image related to an object by CG (Computer Graphics) and using the image for learning a detector.

CITATION LIST

Patent Literature

[PTL 1]
JP 2014-59729A
[PTL 2]
JP 2014-123366A

SUMMARY

Technical Problem

However, the techniques disclosed in the PTL1 and PTL2, do not have sufficient accuracy for cropping the learning image, and it is difficult to generate a detector having high generalization performance. Further, since the CG image as disclosed in PTL 2 has a difference from the image photographed in the real space, there is a limit in improving the detection performance of the object.

Solution to Problem

According to the present disclosure, there is provided an information processing method for causing a processor to execute: automatically cropping a region including an object from a material image to generate an automatically cropped image; and performing learning related to detection of the object on the basis of the automatically cropped image, wherein the generating of the automatically cropped image further includes generating the automatically cropped image using an automatic cropper generated by learning based on manually cropped images obtained by manually cropping a region including the object from the material image.

According to the present disclosure, there is provided a program for causing a computer to function as an information processing device including: an automatic cropping unit that automatically crops a region including an object from a material image to generate an automatically cropped image; and a learning unit that performs learning related to detection of the object on the basis of the automatically cropped image, wherein the automatic cropping unit generates the automatically cropped image using an automatic cropper generated by learning based on manually cropped images obtained by manually cropping a region including the object from the material image.

According to the present disclosure, there is provided an information processing system including: a photographing unit that photographs a material image including an object; an automatic cropping unit that automatically crops a region including the object from the material image to generate an automatically cropped image; a learning unit that performs learning related to detection of the object on the basis of the automatically cropped image; and a detection unit that detects the object on the basis of the result of learning by the learning unit, wherein the automatic cropping unit generates the automatically cropped image using an automatic cropper generated by learning based on manually cropped images obtained by manually cropping a region including the object from the material image.

BRIEF DESCRIPTION OF DRAWINGS

FIG. 13 is a diagram illustrating a hardware configuration example according to an embodiment of the present disclosure.

DESCRIPTION OF EMBODIMENTS

Figure 1:
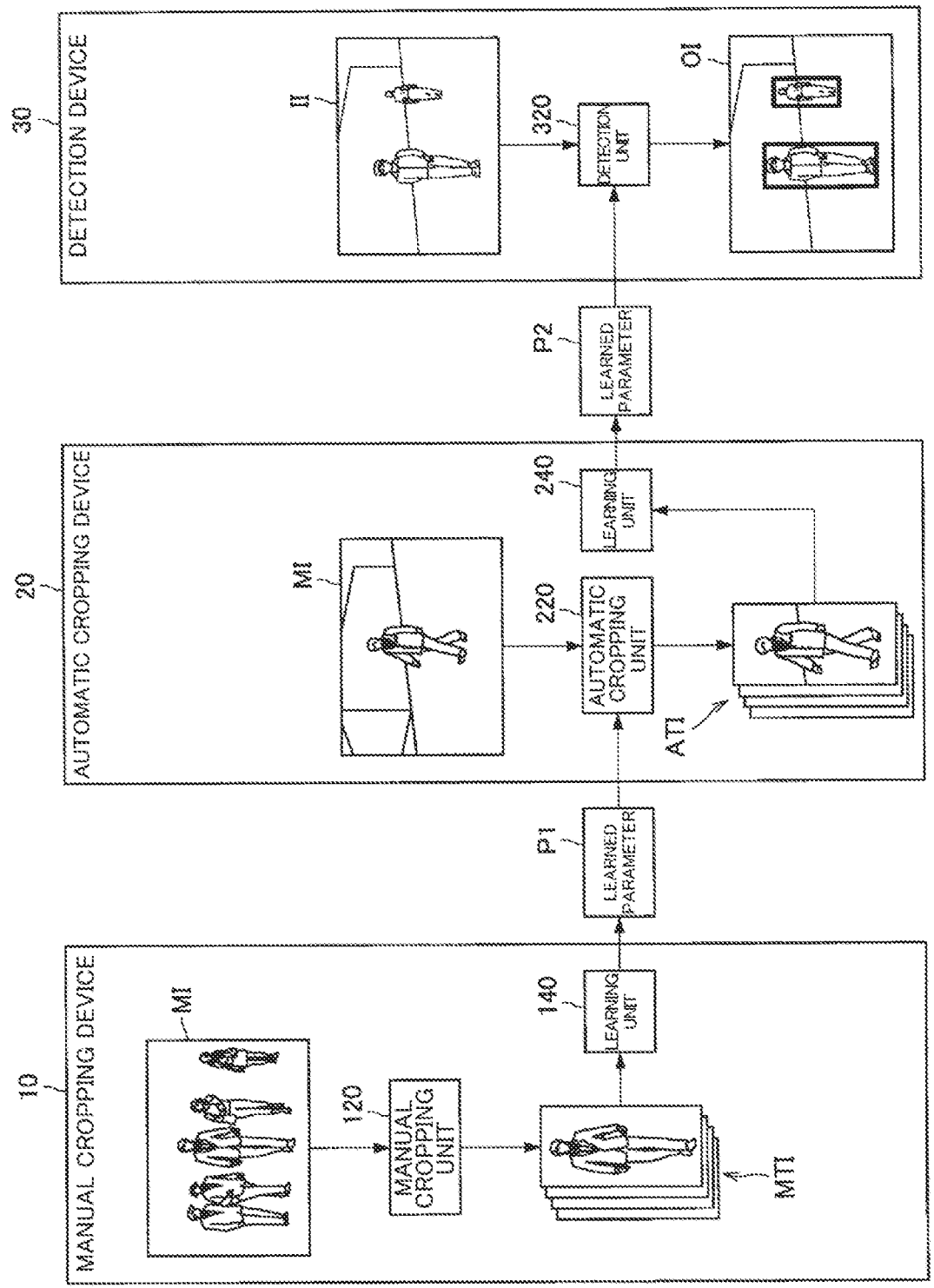
FIG. 1 is a diagram illustrating an overview of an information processing system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. First Embodiment
1.1. Overview
1.2. Functional Configuration Example of Manual Cropping Device 10
1.3. Functional Configuration Example of Automatic Cropping Device 20
1.4. Functional Configuration Example of Detection Device 30
1.5. Process Flow
2. Second Embodiment
3. Third Embodiment
4. Hardware Configuration Example
5. Conclusion

1. FIRST EMBODIMENT

<<1.1. Overview>>

First, the overview of the first embodiment of the present disclosure will be described. As described above, in recent years, devices that perform an operation on the basis of the detection result of an object have become widespread. As an example of the above-mentioned device, for example, an in-vehicle device that detects an object such as a pedestrian or a traveling vehicle from a captured image, outputs an alert, and assists driving can be mentioned.

Here, in order to realize a high-performance object detection function in the in-vehicle device, it is required to secure a large number of cropped images of the object to be used as a learning image at the stage of generating a detector. However, when the above-mentioned cropped images are manually created, costs such as labor cost and work time increase.

For this reason, as in PTL 1 and PTL 2 described above, a method of automatically generating a learning image has also been proposed. However, for example, as described in PTL 2, when a composite image generated by CG is used as a learning image, it may be difficult to sufficiently improve the performance of the detector due to the difference from the reality.

For example, in the generation of a cropped image using a relatively simple non-pattern recognition system or pattern recognition system algorithm disclosed in PTL 1, it is difficult to secure sufficient cropping accuracy. Therefore it is not practical to apply it to devices that require high accuracy, such as in-vehicle devices that detect a pedestrian, for example.

Further, PTL 1 discloses a technique of repeating a single machine learning method using the cropped image generated as described above, but such a method causes a bias in learning and it is difficult to generate a detector with high generalization performance.

The technical idea according to the present disclosure is conceived by paying attention to the above points, and enables a large number of highly accurate learning images to be generated without bias at reduced costs. For this purpose, an information processing method according to an embodiment of the present disclosure causes a processor to execute: automatically cropping a region including an object from a material image to generate an automatically cropped image; and performing learning related to detection of the object on the basis of the automatically cropped image. Further, the generating of the automatically cropped image further includes generating the automatically cropped image using an automatic cropper generated by learning based on manually cropped images obtained by manually cropping a region including the object from the material image.

FIG. 1 is a diagram illustrating an overview of an information processing system according to the first embodiment of the present disclosure. As illustrated in FIG. 1, the information processing system according to the present embodiment may include a manual cropping device 10, an automatic cropping device 20, and a detection device 30. Further, FIG. 1 illustrates an example in which the detection device 30 detects a pedestrian as an object.

(Manual Cropping Device 10)

The manual cropping device 10 according to the present embodiment is an information processing device that performs machine learning to realize the automatic cropping function provided in the automatic cropping device 20. The manual cropping device 10 according to the present embodiment may be a PC (Personal Computer) or the like, for example.

The manual cropping unit 120 of the manual cropping device 10 according to the present embodiment generates a manually cropped image MTI obtained by cropping a region including a pedestrian from a material image MI including a pedestrian which is an object on the basis of an operation of an operator. That is, the operator can operate the manual cropping device 10 to trim the region where the pedestrian is captured from the material image MI and generate a cropped image related to the pedestrian. For example, approximately 16,000 manually cropped images MTI may be generated.

The learning unit 140 of the manual cropping device 10 according to the present embodiment performs machine learning related to the features of the pedestrian on the basis of the manually cropped image MTI cropped manually as described above. The learning unit 140 according to the present embodiment may perform high-performance machine learning using a DNN (Deep Neural Network). According to the learning unit 140 according to the present embodiment, it is possible to learn the features of a pedestrian with high accuracy on the basis of an operator, that is, a subject that a person actually recognizes as a pedestrian. A learned parameter P1 obtained as the result of learning by the learning unit 140 is applied to an automatic cropper provided in the automatic cropping unit 220 of the automatic cropping device 20. According to the parameter application, the automatic cropping unit 220 of the automatic cropping device 20 can crop an object with high accuracy on the basis of the result of high-performance machine learning. The parameter according to the present embodiment broadly includes various parameters generally used in machine learning, such as weights and biases.

(Automatic Cropping Device 20)

The automatic cropping device 20 according to the present embodiment is an information processing device having a function of automatically cropping a region including a pedestrian from the material image MI using a DNN to which the learned parameter P1 obtained as the result of machine learning by the manual cropping device 10 is applied. One of the features of the automatic cropping unit 220 of the automatic cropping device 20 in the present embodiment is that the automatically cropped image ATI is generated using the DNN to which the learned parameter P1 is applied as the automatic cropper. According to the automatic cropping unit 220 according to the present embodiment, a large number of highly accurate automatically cropped images ATI can be generated at high speed using the learned parameter P1 learned on the basis of the manually cropped images MTI generated manually. The automatic cropping unit 220 may generate approximately 1 million automatically cropped images ATI, for example.

The learning unit 240 of the automatic cropping device 20 according to the present embodiment performs medium-performance machine learning related to pedestrian detection using the automatically cropped image ATI automatically generated by the automatic cropping unit 220 as an input. A learned parameter P2 obtained as the result of learning by the learning unit 240 is applied to a detector provided in the detection unit 320 of the detection device 30. According to the automatic cropping device 20 according to the present embodiment, it is possible to generate a detector with high generalization performance at low costs by performing machine learning using a large number of automatically cropped images ATI with high cropping accuracy. The automatic cropping device 20 according to the present embodiment may be a PC, for example.

(Detection Device 30)

The detection device 30 according to the present embodiment is an information processing device that detects a pedestrian using a medium-performance detector to which the parameter P2 obtained as the result of machine learning by the automatic cropping device 20 is applied. The detection device 30 according to the present embodiment may be a camera module mounted in a vehicle, for example.

The detector according to the present embodiment detects an object using HOG (Histograms of Oriented Gradients) features and an SVM (Support Vector Machine). As described above, in the present embodiment, it is possible to realize unbiased learning by automatically generating learning data of medium-performance machine learning using SVM by high-performance machine learning using DNN.

The detection unit 320 of the detection device 30 according to the present embodiment can detect a pedestrian in real time from an input image II captured by a photographing unit 310 described later using the above-mentioned detector. Further, the detection unit 320 according to the present embodiment may output the detection result as an output image OI. The output image OM may be displayed on a display device mounted in a vehicle, for example.

The overview of the information processing system according to the present embodiment has been described above. As described above, according to the information processing method according to the present embodiment, a large number of highly accurate cropped images can be automatically generated at low costs, and as a result, a detector having high generalization performance can be generated.

In the present disclosure, a case where the detection device 30 is a camera module mounted in a vehicle and the object to be detected is a pedestrian will be described as a main example, but the object according to an embodiment of the present disclosure and the detection device 30 are not limited to the above examples. The object according to an embodiment of the present disclosure may broadly include obstacles during movement of various moving objects including vehicles. Examples of obstacles include other moving objects, animals, and installations on a movement route as well as persons including pedestrians. Further, as an example of the above-mentioned moving object, a ship, an aircraft including a drone, various autonomous mobile polymorphic robots, and the like can be mentioned, for example. Furthermore, the detection device 30 according to an embodiment of the present disclosure may be a surveillance camera or the like, for example. The technical idea of the present disclosure can be widely applied to generation of various detectors for detecting an object.

<<1.2. Functional Configuration Example of Manual Cropping Device 10>>

Figure 2:
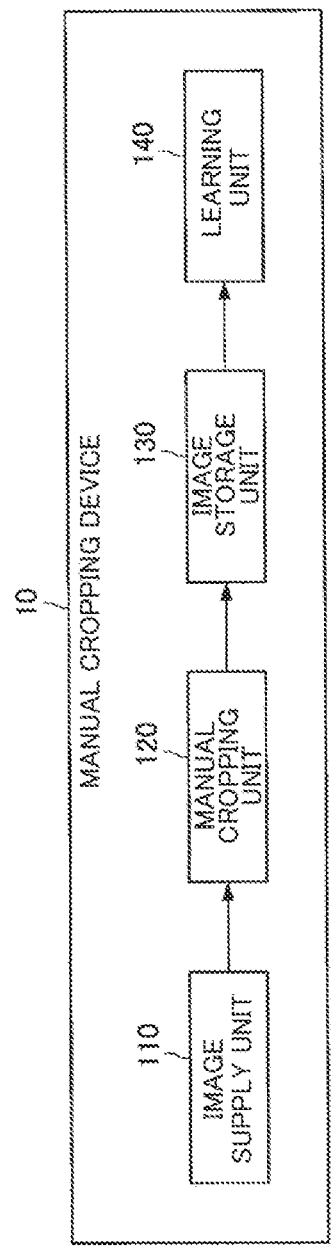
FIG. 2 is a block diagram illustrating a functional configuration example of a manual cropping device according to the embodiment.

Next, a functional configuration example of the manual cropping device 10 according to the present embodiment will be described in detail. FIG. 2 is a block diagram illustrating a functional configuration example of the manual cropping device 10 according to the present embodiment. As illustrated in FIG. 2, the manual cropping device 10 according to the present embodiment includes an image supply unit 110, a manual cropping unit 120, an image storage unit 130, and a learning unit 140.

(Image Supply Unit 110)

The image supply unit 110 according to the present embodiment has a function of supplying a material image with an object as a subject to the manual cropping unit 120. The image supply unit 110 may supply a material image registered manually in advance by the manual cropping unit 120, for example. Further, the image supply unit 110 can also supply a material image automatically supplied from the Internet to the manual cropping unit 120, for example.

(Manual Cropping Unit 120)

The manual cropping unit 120 according to the present embodiment has a function of cropping a region including an object from a material image and generating a manually cropped image on the basis of an operation of an operator. For this purpose, the manual cropping unit 120 according to the present embodiment may provide the operator with an image editing interface with which a trimming operation, for example, can be performed.

(Image Storage Unit 130)

The image storage unit 130 according to the present embodiment stores the manually cropped image generated by the manual cropping unit 120.

(Learning Unit 140)

The learning unit 140 according to the present embodiment performs machine learning related to the features of the object using the manually cropped image generated by the manual cropping unit 120 and stored by the image storage unit 130 as an input. As described above, the learning unit 140 according to the present embodiment may perform machine learning using DNN or the like. The learned parameters obtained as the result of learning by the learning unit 140 are applied to the automatic cropper provided in the automatic cropping device 20.

The functional configuration example of the manual cropping device 10 according to the present embodiment has been described above. The configuration described with reference to FIG. 2 is merely an example, and the functional configuration of the manual cropping device 10 according to the present embodiment is not limited to such an example. The functional configuration of the manual cropping device 10 according to the present embodiment may be flexibly modified according to specifications and operations.

<<1.3. Functional Configuration Example of Automatic Cropping Device 20>>

Figure 3:
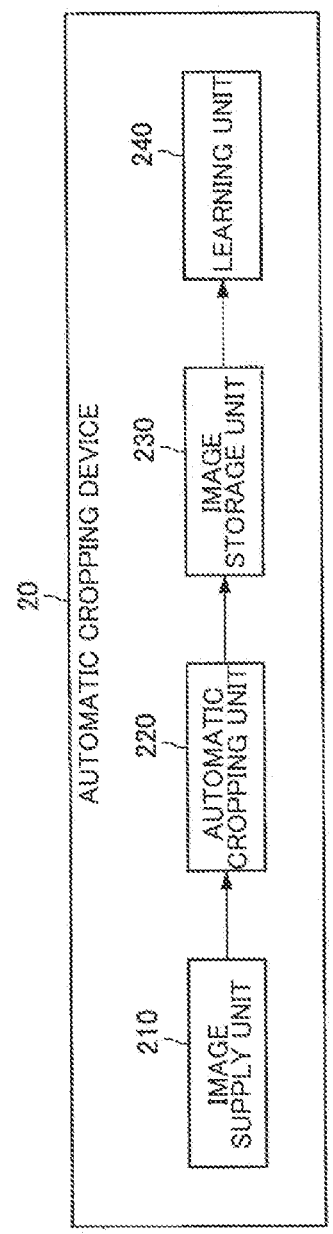
FIG. 3 is a block diagram illustrating a functional configuration example of an automatic cropping device according to the embodiment.

Next, a functional configuration example of the automatic cropping device 20 according to the present embodiment will be described in detail. FIG. 3 is a block diagram illustrating a functional configuration example of the automatic cropping device 20 according to the present embodiment. As illustrated in FIG. 3, the automatic cropping device 20 according to the present embodiment includes an image supply unit 210, an automatic cropping unit 220, an image storage unit 230, and a learning unit 240.

(Image Supply Unit 210)

The image supply unit 210 according to the present embodiment has a function of supplying a material image with an object as a subject to the automatic cropping unit 220. The image supply unit 210 may supply the material image registered in advance manually or the material image automatically supplied from the Internet to the automatic cropping unit 220.

(Automatic Cropping Unit 220)

The automatic cropping unit 220 according to the present embodiment has a function of automatically cropping a region including an object from the material image and generating an automatically cropped image. As described above, one of the features of the automatic cropping unit 220 according to the present embodiment is that an automatically cropped image is generated using an automatic cropper to which the learned parameters obtained as the result of machine learning by the manual cropping device 10 are applied. The details of the function of the automatic cropping unit 220 according to the present embodiment will be described later.

(Image Storage Unit 230)

The image storage unit 230 according to the present embodiment stores the automatically cropped image generated by the automatic cropping unit 220.

(Learning Unit 240)

The learning unit 240 according to the present embodiment performs machine learning related to the detection of an object using the automatically cropped image generated by the automatic cropping unit 220 and stored by the image storage unit 230 as an input. The learning unit 240 according to the present embodiment may perform machine learning using HOG features and SVM or the like. The learned parameters obtained as the result of learning by the learning unit 240 are applied to the detector provided in the detection device 30.

The functional configuration example of the automatic cropping device 20 according to the present embodiment has been described above. The above configuration described with reference to FIG. 3 is merely an example, and the functional configuration of the automatic cropping device 20 according to the present embodiment is not limited to such an example. The functional configuration of the automatic cropping device 20 according to the present embodiment may be flexibly modified according to specifications and operations.

<<1.4. Functional Configuration Example of Detection Device 30>>

Figure 4:
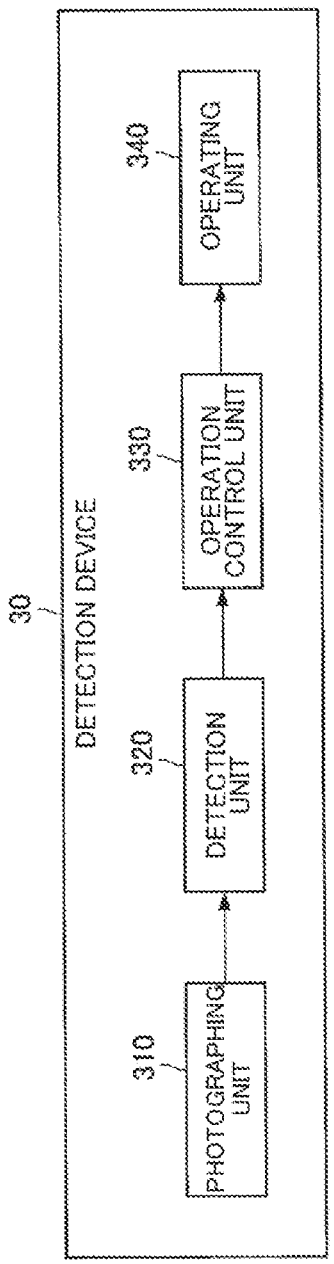
FIG. 4 is a block diagram illustrating a functional configuration example of a detection device according to the embodiment.

Next, a functional configuration example of the detection device 30 according to the present embodiment will be described in detail. FIG. 4 is a block diagram illustrating a functional configuration example of the detection device 30 according to the present embodiment. As illustrated in FIG. 4, the detection device 30 according to the present embodiment includes a photographing unit 310, a detection unit 320, an operation control unit 330, and an operating unit 340.

(Photographing Unit 310)

The photographing unit 310 according to the present embodiment has a function of photographing an image (RGB image) around the vehicle. The image includes a moving image and a still image.

(Detection Unit 320)

The detection unit 320 according to the present embodiment has a function of detecting an object in real time from the image captured by the photographing unit 310 using a detector to which the learned parameters obtained as the result of learning by the automatic cropping device 20 are applied. The detection unit 320 according to the present embodiment outputs the detection result of the object to the operation control unit 330. The detection unit 320 according to the present embodiment is realized by a microcontroller, for example.

(Operation Control Unit 330)

The operation control unit 330 according to the present embodiment has a function of controlling the operation of the operating unit 340 on the basis of the detection result of the object by the detection unit 320. For example, the operation control unit 330 according to the present embodiment may cause the operating unit 340 to output an alert or cause the operating unit 340 to operate the brake on the basis of the detection unit 320 detecting an object in front of the vehicle. Further, when the detection unit 320 outputs the detection result of the object as an output image OI as illustrated in FIG. 1, the operation control unit 330 may display the output image OI on a display device included in the operating unit 340.

(Operating Unit 340)

The operating unit 340 according to the present embodiment executes various operations on the basis of the control of the operation control unit 330. The operating unit 340 according to the present embodiment may include an accelerator, a brake, a steering wheel, a display device, a speaker, and the like, for example.

The functional configuration example of the detection device 30 according to the present embodiment has been described above. The above configuration described with reference to FIG. 4 is merely an example, and the functional configuration of the detection device 30 according to the present embodiment is not limited to such an example. The functional configuration of the detection device 30 according to the present embodiment may be flexibly modified according to specifications and operations.

<<1.5. Process Flow>>

Next, the flow of processing of the manual cropping device 10, the automatic cropping device 20, and the detection device 30 according to the present embodiment will be described in detail.

Figure 5:
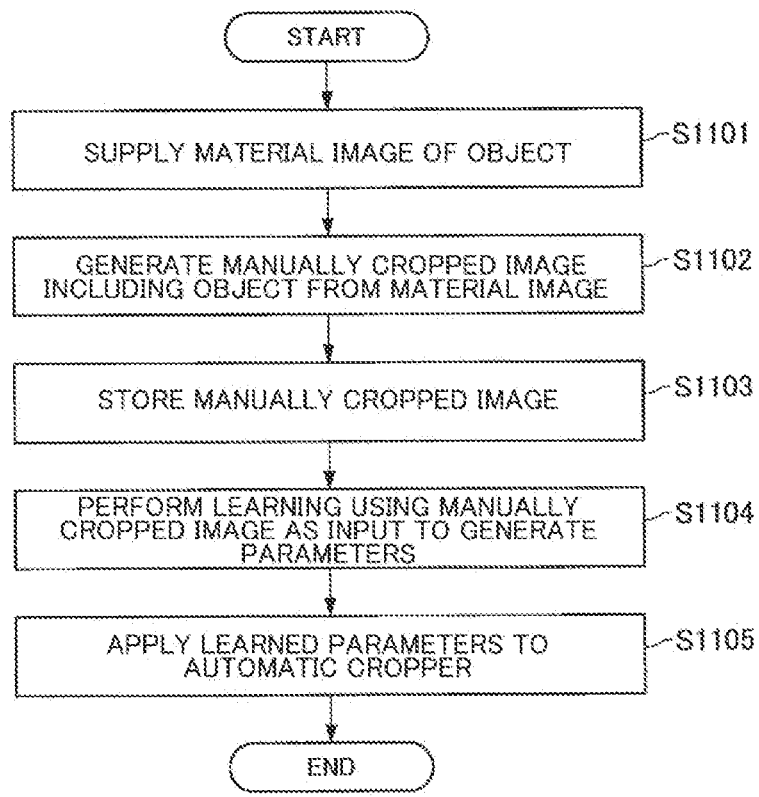
FIG. 5 is a flowchart illustrating the flow of processing of a manual cropping device according to the embodiment.

First, the flow of processing of the manual cropping device 10 according to the present embodiment will be described. FIG. 5 is a flowchart illustrating the flow of processing of the manual cropping device 10 according to the present embodiment.

Referring to FIG. 5, first, the image supply unit 110 supplies the material image to the manual cropping unit 120 (S1101).

Subsequently, the manual cropping unit 120 crops a region including an object from the material image supplied in step S1101 on the basis of the user operation, and generates a manually cropped image (S1102).

Subsequently, the image storage unit 130 stores the manually cropped image generated in step S1102 (S1103).

Subsequently, the learning unit 140 executes learning related to the features of the object using the manually cropped image stored in step S1103 as an input and generates parameters (S1104).

Subsequently, the learning unit 140 applies the learned parameters obtained in step S1104 to the automatic cropper provided in the automatic cropping device 20 (S1105).

Figure 6:
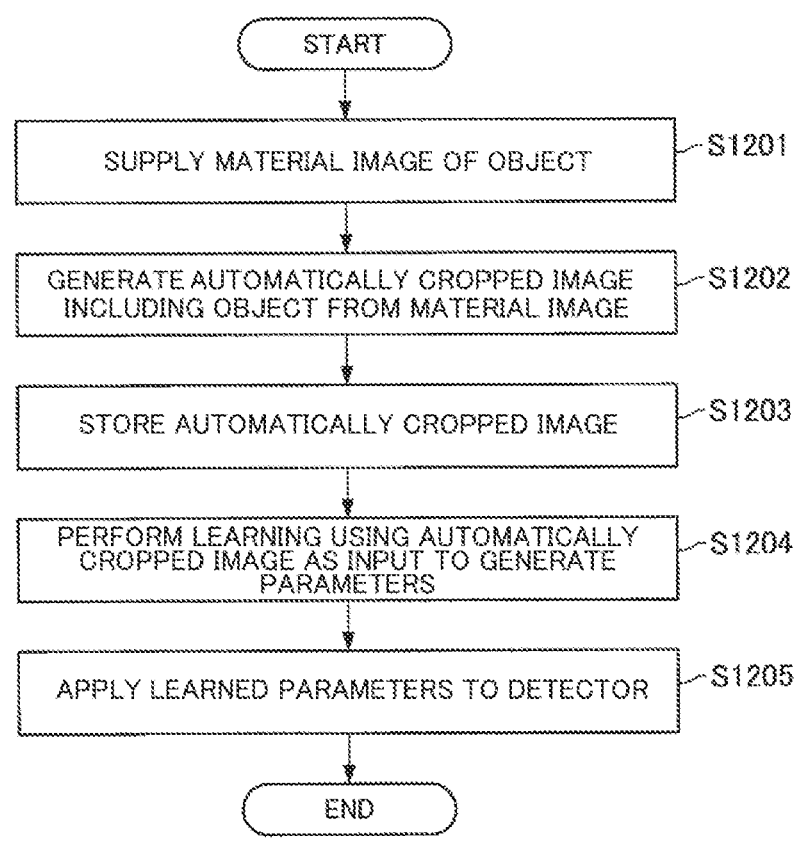
FIG. 6 is a flowchart illustrating the flow of processing of the automatic cropping device according to the embodiment.

The flow of processing of the manual cropping device 10 according to the present embodiment has been described in detail above. Next, the flow of processing of the automatic cropping device 20 according to the present embodiment will be described in detail. FIG. 6 is a flowchart illustrating the flow of processing of the automatic cropping device 20 according to the present embodiment.

Referring to FIG. 6, first, the image supply unit 210 supplies the material image to the automatic cropping unit 220 (S1201).

Subsequently, the automatic cropping unit 220 automatically crops the region including the object from the material image supplied in step S1201 using the automatic cropper to which the learned parameters are applied in step S1105 of FIG. 5, and generates an automatically cropped image (S1202).

Subsequently, the image storage unit 230 stores the automatically cropped image generated in step S1202 (S1203).

Subsequently, the learning unit 240 executes learning related to the detection of the object using the automatically cropped image stored in step S1203 as an input and generates parameters (S1204).

Subsequently, the learning unit 240 applies the learned parameters obtained in step S1204 to the detector provided in the detection device 30 (S1205).

The flow of processing of the automatic cropping device 20 according to the present embodiment has been described above. Next, the generation of the automatically cropped image by the automatic cropping unit 220 according to the present embodiment will be described in more detail.

Figure 7:
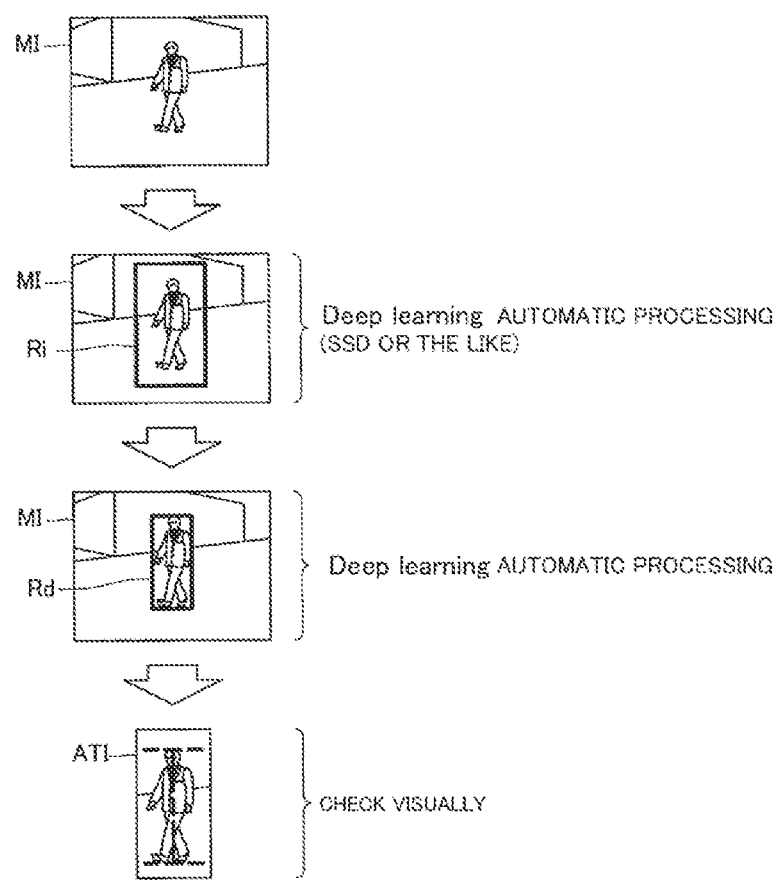
FIG. 7 is a diagram illustrating the flow of generating an automatically cropped image according to the embodiment.

FIG. 7 is a diagram illustrating the flow of generating an automatically cropped image according to the present embodiment. The generation of the automatically cropped image by the automatic cropping unit 220 according to the present embodiment is realized roughly by two processes.

Specifically, first, the automatic cropping unit 220 according to the present embodiment identifies an interim region Ri which is an approximate region including an object from the material image MI supplied by the image supply unit 210 by a high-speed object detection method using deep learning. Examples of the above-mentioned high-speed object detection method include SSD (Single Shot multibox Detector). Using a high-speed object detection method such as SSD, the automatic cropping unit 220 according to the present embodiment can identify an approximate interim region Ri including an object in the material image MI at a relatively high speed (for example, in 100 msec if the automatic cropping device 20 is equipped with the latest GPU (Graphics Processing Unit) at the time of filing this application). The automatic cropping unit 220 may identify a region slightly wider than the region derived by SSD or the like as the interim region Ri.

In identification of the interim region Ri using the SSD as described above, the parameters learned from the contest image or the like, which can be acquired from the Internet may be used, for example. Using the learned parameters as described above, the time required for learning and the cost of generating the learning image can be significantly reduced.

The high-speed object detection method using deep learning according to the present embodiment is not limited to SSD. The automatic cropping unit 220 according to the present embodiment may identify the interim region Ri using Faster RCNN (Regions with Convolutional Neural Networks) or YOLO (You Only Look Once), for example.

Subsequently, the automatic cropping unit 220 according to the present embodiment automatically crops a detailed region Rd including the object from the interim region Ri identified by the SSD using the above-mentioned automatic cropper, and generates an automatically cropped image ATI. Here, the detailed region Rd according to the present embodiment may be a rectangular region that is smaller than the interim region Ri and excludes a region that does not include the object as much as possible. For example, when the object is a pedestrian, the upper end of the detailed region Rd may substantially coincide with the upper end of the pedestrian's head, and the lower end of the detailed region Rd may substantially coincide with the lower end of the pedestrian's foot.

As described above, one of the features of the automatic cropping unit 220 according to the present embodiment is that the process of identifying the interim region Ri and the process of automatically cropping the detailed region Rd are executed using two different neural networks.

According to the above-mentioned features of the automatic cropping unit 220 according to the present embodiment, since the interim region Ri which is an approximate region including the object is identified as a preliminary step of the automatic cropping, the detailed region Rd can be cropped without scanning the material image Mi completely and the time required for generating the automatically cropped image ATI can be significantly reduced.

The flow of generating the automatically cropped image ATI according to the present embodiment has been described in detail above. As illustrated in the lower part of FIG. 7, the automatically cropped image ATI generated by the automatic cropping unit 220 as described above may be stored in the image storage unit 230 after the operator confirms whether a correct region is cropped.

A case where the automatic cropping unit 220 according to the present embodiment identifies the interim region from the material image using a high-speed object detection method such as SSD has been described above, but when the material image is a continuous frame of a moving image, the automatic cropping unit 220 may identify an approximate region in which the object is photographed by acquiring information such as a motion vector from the continuous frame.

Figure 8:
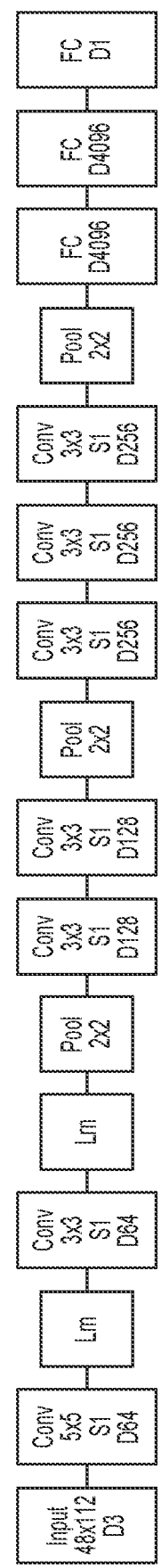
FIG. 8 is a diagram illustrating an example of a network structure of an automatic cropper according to the embodiment.

Next, the network structure of the automatic cropper according to the present embodiment will be described in detail. FIG. 8 is a diagram illustrating an example of a network structure of the automatic cropper according to the present embodiment. The network structure illustrated in FIG. 8 is merely an example, and the network structure of the automatic cropper according to the present embodiment may be flexibly deformed.

In FIG. 8, "Conv" indicates a "Convolution" layer, "Lrn" indicates "Local response normalization", "Pool" indicates "Pooling", and "FC" indicates "Fully Connected" layer. Further, "S" in each layer indicates a stride, and "D" indicates the number of filters.

For example, ReLU may be adopted as an activation function, and Max Pooling may be adopted as Pooling. Further, an output layer may be an identity function, and the sum of squares error may be used for a loss function.

An example of the network configuration of the automatic cropper according to the present embodiment has been described above. In the present embodiment, in the above-mentioned network, learning is performed in such a way that a cropped image in which the upper end of the head and the lower end of the foot coincide with the upper and lower ends of the image, respectively, is regarded as a positive image and an image in which the upper end of the head and the lower end of the foot are misaligned with respect to the upper and lower ends of the image is regarded as a negative image. At this time, for example, 256.0 may be given to the positive image and 0.0 may be given to the negative image as teaching data, and it may be determined whether the image is accurately cropped with the output value of 128.0 as a threshold value.

The accuracy of automatic cropping can be secured by giving approximately 16,000 positive images that have been normalized in the image and approximately 204,000 negative images that have been normalized in the image as learning data. Further, in order to generate an automatic cropper that is tolerant to changes in color, brightness, and contrast, an image subjected to data expansion that randomly changes color, brightness, and contrast may be used for learning. Further, an image subjected to data expansion that mirrors the image in the left-right direction may be used. Since the data expansion as described above does not affect the positions of the head and the foot, it is possible to secure a number of pieces of learning data without deteriorating the accuracy of automatic cropping.

As an example of other data expansion, an increase in variations using segmentation by FCN (Fully Convolutional Networks) may be used, for example. According to FCN, for example, a clothing region of a pedestrian in an image may be identified to generate an image in which the clothing color is changed, or a skin region may be identified to change the skin color to generate an image which expresses racial differences. Further, according to FCN, it is possible to change the building or road on the background in the image to a different building or the like. Furthermore, it is possible to diversify the variation of the material image by identifying the position of the hand of a person in the image using the object detection method and overwriting the bag or the like thereon.

Figure 9:
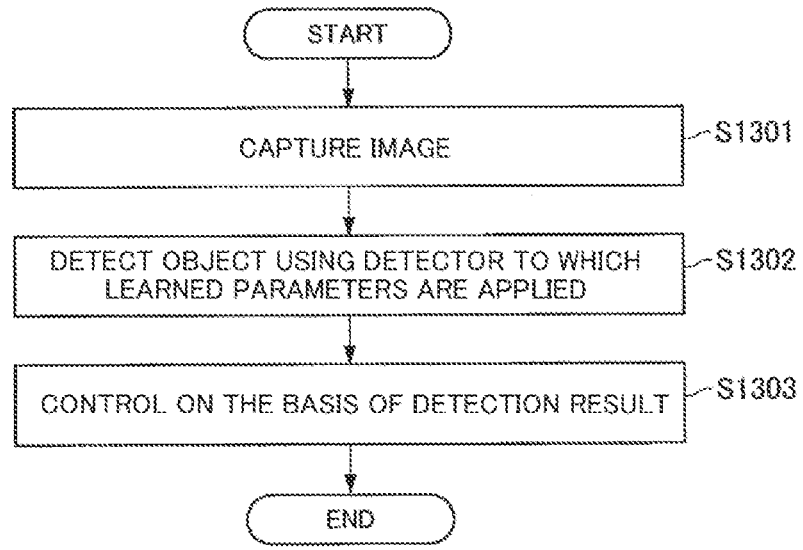
FIG. 9 is a flowchart illustrating the flow of processing of a detection device according to the embodiment.

The flow of processing of the automatic cropping device 20 according to the present embodiment has been described in detail above. Next, the flow of processing of the detection device 30 according to the present embodiment will be described. FIG. 9 is a flowchart illustrating the flow of processing of the detection device 30 according to the present embodiment.

Referring to FIG. 9, first, the photographing unit 310 captures an RGB image around the vehicle (S1301).

Subsequently, the detection unit 320 detects an object from the RGB image captured in step S1301 using a detector to which the learned parameters obtained as the result of learning by the automatic cropping device 20 are applied (S1302).

Subsequently, the operation control unit 330 causes the operating unit 340 to execute various operations on the basis of the detection result in step S1302 (S1303). For example, the operation control unit 330 may cause the operating unit 340 to display an image indicating the region of the detected object or cause the operating unit 340 to operate the brake or the like on the basis of the fact that the object has been detected.

2. SECOND EMBODIMENT

Next, a second embodiment of the present disclosure will be described. In the first embodiment described above, a case where only the RGB image is supplied to the automatic cropping unit 220 of the automatic cropping device 20 has been described. On the other hand, in the second embodiment of the present disclosure, in addition to the RGB image, a distance image photographed at the same time may be supplied to the automatic cropping unit 220 together. Examples of the distance image include a ToF (Time of Flight) image. The RGB image and the distance image may be simultaneously captured by a photographing device such as an RGB-D camera, for example, or may be captured by two different photographing devices installed in parallel.

At this time, the automatic cropping unit 220 according to the present embodiment may make a determination regarding the adoption of the automatically cropped image on the basis of the distance image photographed at the same time as the RGB image. That is, the learning unit 240 according to the present embodiment can perform learning on the basis of the automatically cropped image adopted on the basis of the distance between the object and the photographing device at the time of photographing the material image.

Hereinafter, adoption of an automatically cropped image using the distance image according to the present embodiment will be described in detail. In the following, the differences from the first embodiment will be mainly described, and redundant description will be omitted for common functions and effects.

Figure 10:
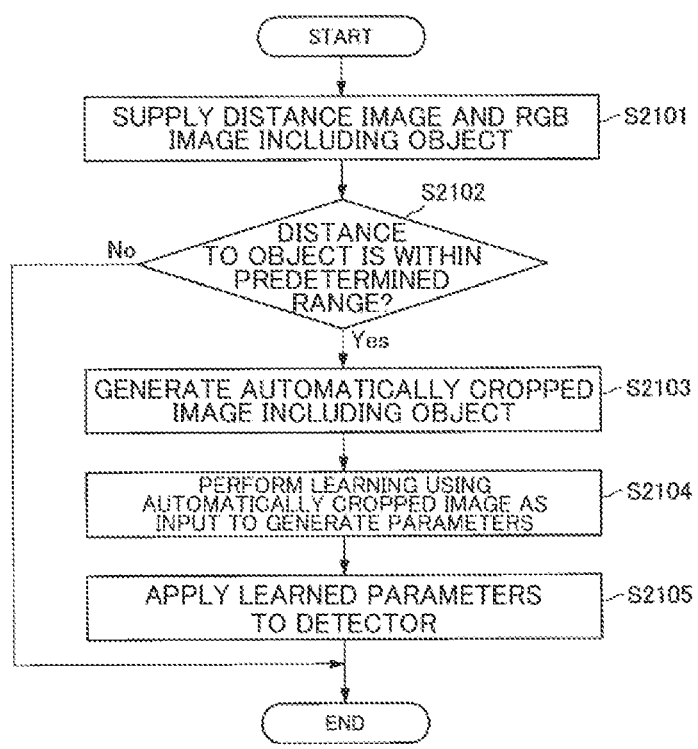
FIG. 10 is a diagram illustrating the flow of processing of an automatic cropping device according to a second embodiment of the present disclosure.

FIG. 10 is a diagram illustrating the flow of processing of the automatic cropping device 20 according to the second embodiment of the present disclosure.

Referring to FIG. 10, first, the image supply unit 210 supplies the RGB image including the object and the distance image photographed at the same time as the RGB image to the automatic cropping unit 220 (S2101).

Subsequently, the automatic cropping unit 220 identifies an interim region in the RGB image using a high-speed object detection method such as SSD and determines whether the distance between the object and the photographing device is within a predetermined range on the basis of the distance image (S2102).

Here, when the distance between the object and the photographing device is not within a predetermined range (S2102: No), the automatic cropping unit 220 may end the process without performing automatic cropping on the supplied RGB image. According to this, as will be described later, it is possible to improve the efficiency of processing without unnecessarily generating an automatically cropped image that is not suitable as learning data.

On the other hand, when the distance between the object and the photographing device is within the predetermined range (S2102: Yes), the automatic cropping unit 220 generates an automatically cropped image and the image storage unit 230 stores the automatically cropped image (S2103).

Subsequently, the learning unit 240 executes learning using the automatically cropped image stored in step S2103 as an input and generates parameters (S2104).

Subsequently, the learning unit 240 applies the learned parameters obtained in step S2104 to the detector provided in the detection device 30 (S2015).

An example of the flow of processing of the automatic cropping device 20 according to the present embodiment has been illustrated. As described above, in the present embodiment, only the automatically cropped image in which the distance to the object at the time of photographing is within a predetermined range is input to the learning unit 240.

In the above-mentioned predetermined range, a value is set such that the distance between the object and the photographing device is not too close and not too far. In an image where the distance between the object and the photographing device is too close, it is expected that the object will appear distorted in many cases, and it is expected that the use of the distorted image for learning may reduce the performance of the detector. Therefore, it is possible to secure the performance of the generated detector by excluding an image in which the distance between the object and the photographing device is too close on the basis of the distance image.

In an image in which the distance between the object and the photographing device is too long, a large amount of noise will be added to the region including the object. A noisy image can be a factor that degrades the performance of the detector. Therefore, it is possible to secure the performance of the generated detector by excluding the image in which the distance between the object and the photographing device is too long on the basis of the distance image.

The second embodiment of the present disclosure has been described above. According to the automatic cropping device 20 according to the present embodiment, it is possible to generate a detector having higher generalization performance. In the above description, a case where the automatic cropping unit 220 according to the present embodiment automatically crops a region from the material image only when the distance between the object and the photographing device is within a predetermined range has been described as an example, but the determination timing of adoption is not limited to this example.

For example, the automatic cropping unit 220 according to the present embodiment may determine the adoption of the automatically cropped image on the basis of the distance image after generating the automatically cropped image. For example, first, the automatic cropping unit 220 may generates an automatically cropped image regardless of the distance and store the automatically cropped image in the image storage unit 230 only when the distance between the object and the photographing device is within a predetermined range. Further, in the stage before supplying the material image to the automatic cropping unit 220, the operator can roughly visually select the image, for example.

3. THIRD EMBODIMENT

Next, a third embodiment of the present disclosure will be described. In the first and second embodiments described above, a case where the detection of the object using the detector and the learning for generating the detector are performed by separate devices (that is, the automatic cropping device 20 and the detection device 30) has been described. On the other hand, in the third embodiment of the present disclosure, a configuration in which both functions are realized by a single device will be described. That is, the detection device 30 according to the present embodiment may be able to perform self-learning on the basis of the captured image and automatically update the parameters of the detector.

Hereinafter, the function of the detection device 30 according to the third embodiment of the present disclosure will be described in detail. In the following, the differences between the first and second embodiments will be mainly described, and redundant description will be omitted for the functions and effects common to the first and second embodiments.

Figure 11:
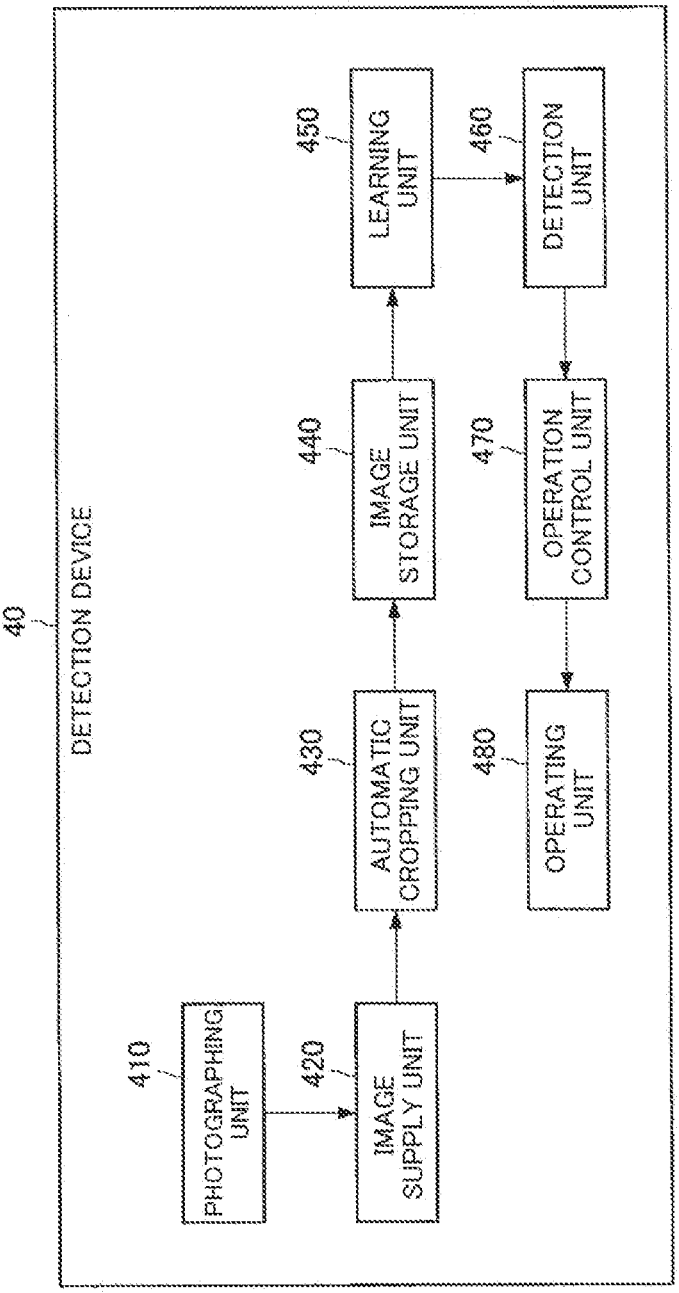
FIG. 11 is a block diagram illustrating a functional configuration of a detection device according to a third embodiment of the present disclosure.

FIG. 11 is a block diagram illustrating a functional configuration of a detection device 40 according to the third embodiment of the present disclosure. As illustrated in FIG. 11, the detection device 40 according to the present embodiment includes a photographing unit 410, an image supply unit 420, an automatic cropping unit 430, an image storage unit 440, a learning unit 450, a detection unit 460, an operation control unit 470, and an operating unit 480.

That is, it can be said that the detection device 40 according to the present embodiment further has an automatic cropping function and a learning function in addition to the configuration of the detection device 30 according to the first and second embodiments. According to the configuration, using an image photographed as the vehicle travels as a material image, learning related to detection can be continuously performed and parameters can be continuously updated.

The learning unit 450 according to the present embodiment can determine whether the performance of the newly generated parameters exceeds the performance of the current parameters using an evaluation image set. At this time, the learning unit 450 according to the present embodiment may automatically update the parameters of the detector only when the performance of the newly generated parameters exceeds the performance of the current parameters. According to the function of the learning unit 450 according to the present embodiment, it is possible to improve the generalization performance of the detector as the vehicle travels.

Figure 12:
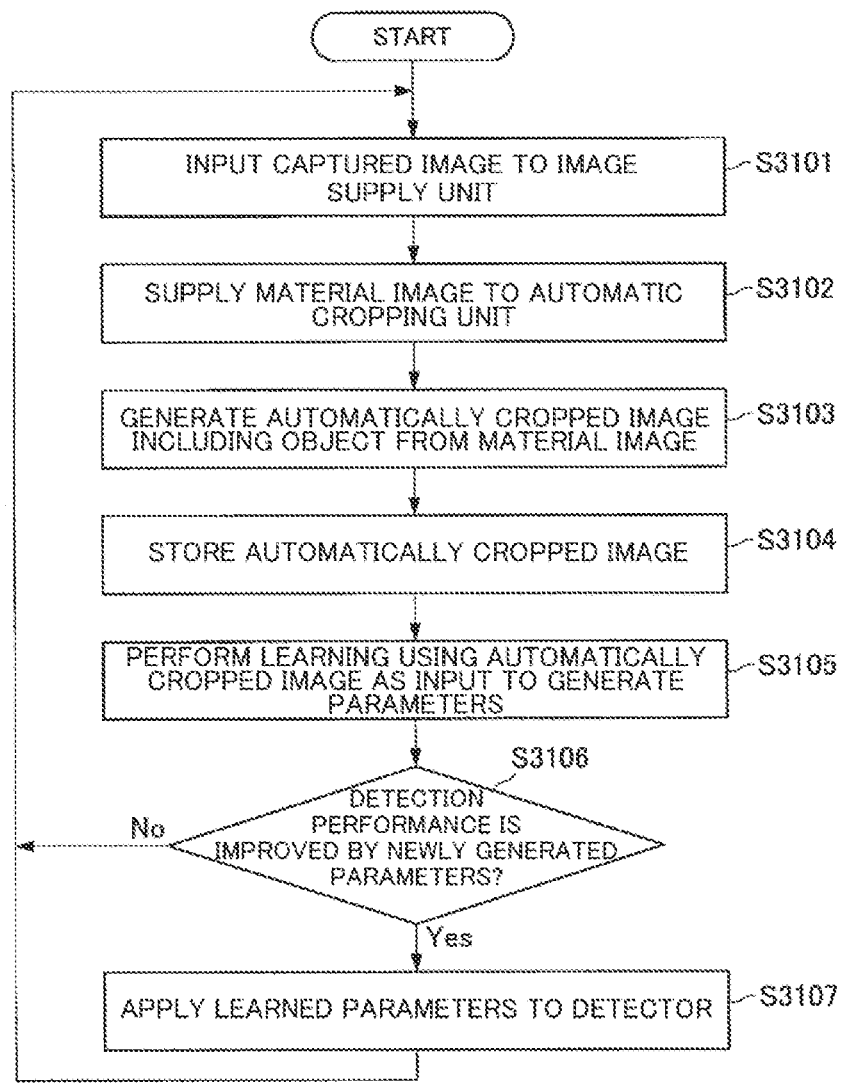
FIG. 12 is a flowchart illustrating the flow of a detector parameter update process by the detection device according to the embodiment.

FIG. 12 is a flowchart illustrating the flow of a detector parameter update process by the detection device 40 according to the present embodiment. Referring to FIG. 12, first, the photographing unit 410 inputs the captured image to the image supply unit 420 (S3101).

Subsequently, the image supply unit 420 supplies the image input in step S3101 as a material image to the automatic cropping unit 430 (S3102).

Subsequently, the automatic cropping unit 430 generates an automatically cropped image including an object from the material image supplied in step S3102 (S3103). At this time, as described in the second embodiment, the automatic cropping unit 430 may make determination related to the adoption of the automatically cropped image on the basis of the distance to the object.

Subsequently, the image storage unit 440 stores the automatically cropped image generated in step S3103 (S3104).

Subsequently, the learning unit 450 executes learning related to the detection of the object using the automatically cropped image stored in step S3104 as an input and generates parameters (S3105).

Subsequently, the learning unit 450 determines whether the performance of the detector is improved by the parameters newly generated in step S3105 on the basis of the evaluation image set (S3106).

Here, when it is determined that the performance of the detector is not improved by the newly generated parameters (S3106: No), the learning unit 450 does not update the parameters of the detector, and the detection device 40 returns to step S3101.

On the other hand, when it is determined that the performance of the detector is improved by the newly generated parameters (S3106: Yes), the learning unit 450 updates the parameter of the detector, and the detection device 40 returns to step S3101.

The flow of the detector parameter update process according to the present embodiment has been described above. According to the processing of the detection device 40 according to the present embodiment, it is possible to efficiently improve the object detection performance by continuously performing the learning related to detection and updating the parameters.

The detection device 40 according to the present embodiment may transmit the learned parameters to an external server or the like via a network. In this case, the server can identify the parameter that realizes the highest detection performance among the parameters collected from a plurality of detection devices 40 and distribute the parameter to each detection device 40. According to such a configuration, parameters having high performance can be widely shared among the plurality of detection devices 40, and the detection device 40 having high detection performance can be efficiently mass-produced.

On the other hand, the sharing of the parameters may be limited to the detection devices 40 in which the mounted vehicles or the photographing units 410 have the same specifications and an individual difference is small. When the individual difference between the mounted vehicles or the photographing units 410 is large, the object detection performance can be effectively improved using only the parameters self-learned by each detection device 40.

When the detection device 40 communicates with an external server or the like via a network, the automatically cropped image generation function of the automatic cropping unit 430 may not necessarily be realized as a function of the detection device 40. For example, the detection device 40 may perform learning using the automatically cropped image by transmitting a material image to the server via the network and receiving the automatically cropped image generated by the server. In this case, the power consumption of the detection device 40 can be reduced, and the size of the housing can be reduced.

4. HARDWARE CONFIGURATION EXAMPLE

Next, a hardware configuration example of the automatic cropping device 20 according to an embodiment of the present disclosure will be described. FIG. 13 is a block diagram illustrating a hardware configuration example of the automatic cropping device 20 according to the embodiment of the present disclosure. Referring to FIG. 13, the automatic cropping device 20 includes a processor 871, a ROM 872, a RAM 873, a host bus 874, a bridge 875, an external bus 876, an interface 877, an input device 878, an output device 879, a storage 880, a drive 881, a connection port 882, and a communication device 883, for example. The hardware configuration illustrated here is an example, and some of the components may be omitted. In addition, components other than the components illustrated here may be further included.

(Processor 871)

The processor 871 functions as an arithmetic processing unit or a control device, for example, and controls all or a part of the operation of each component on the basis of various programs recorded in the ROM 872, the RAM 873, the storage 880, or a removable recording medium 901. The processor 871 includes a GPU and a CPU, for example.

(ROM 872, RAM 873)

The ROM 872 is a means for storing a program read into the processor 871 and data used for calculation. The RAM 873 temporarily or permanently stores a program read into the processor 871 and various parameters that change as appropriate when the program is executed, for example.

(Host Bus 874, Bridge 875, External Bus 876, Interface 877)

The processors 871, the ROM 872, and the RAM 873 are connected to each other via a host bus 874 capable of transmitting data at a high speed, for example. On the other hand, the host bus 874 is connected to the external bus 876, which has a relatively low data transmission speed, via the bridge 875, for example. In addition, the external bus 876 is connected to various components via the interface 877.

(Input Device 878)

For the input device 878, for example, a mouse, a keyboard, a touch panel, buttons, switches, levers, and the like are used. Further, as the input device 878, a remote controller (hereinafter, remote controller) capable of transmitting a control signal using infrared rays or other radio waves may be used. Further, the input device 878 includes a voice input device such as a microphone.

(Output Device 879)

The output device 879 is a device that can visually or audibly provide the user with acquired information, such as a display device such as a CRT (Cathode Ray Tube), LCD, or organic EL, an audio output device such as a speaker or headphones, a printer, a mobile phone, or a facsimile. Further, the output device 879 according to the present disclosure includes various vibration devices capable of outputting a tactile stimulus.

(Storage 880)

The storage 880 is a device for storing various types of data. As the storage 880, for example, a magnetic storage device such as a hard disk drive (HDD), a semiconductor storage device, an optical storage device, an optical magnetic storage device, or the like is used.

(Drive 881)

The drive 881 is a device that reads information recorded on a removable recording medium 901 such as, for example, a magnetic disk, an optical disk, a magneto-optical disk, or a semiconductor memory, or writes information on the removable recording medium 901.

(Removable Recording Medium 901)

The removable recording medium 901 is a DVD medium, a Blu-ray (registered trademark) medium, an HD DVD medium, various semiconductor storage media, and the like, for example. Naturally, the removable recording medium 901 may be an IC card equipped with a non-contact type IC chip, an electronic device, or the like, for example.

(Connection Port 882)

The connection port 882 is a port for connecting an externally connected device 902, such as, for example, a USB (Universal Serial Bus) port, an IEEE1394 port, a SCSI (Small Computer System Interface), an RS-232C port, or an optical audio terminal.

(Externally Connected Device 902)

The externally connected device 902 is a printer, a portable music player, a digital camera, a digital video camera, an IC recorder, or the like, for example.

(Communication Device 883)

The communication device 883 is a communication device for connecting to a network, and, for example, is a wired or wireless LAN, a Bluetooth (registered trademark), or a communication card for WUSB (Wireless USB), a router for optical communication, and a router for ADSL (Asymmetric Digital Subscriber Line), a modem for various communications, or the like.

5. CONCLUSION

As described above, according to the automatic cropping device 20 according to an embodiment of the present disclosure, an information processing method is realized, the method causing a processor to execute: automatically cropping a region including an object from a material image to generate an automatically cropped image; and performing learning related to detection of the object on the basis of the automatically cropped image, wherein the generating of the automatically cropped image further includes generating the automatically cropped image using an automatic cropper generated by learning based on manually cropped images obtained by manually cropping a region including the object from the material image. According to the information processing method according to an embodiment of the present disclosure, it is possible to generate a large number of highly accurate learning images without bias at reduced costs.

While the preferred embodiments of the present disclosure have been described above with reference to the accompanying drawings, the technical scope of the present disclosure is not limited to the above examples. A person skilled in the art may find various alterations and modifications within the scope of the technical idea described in the claims, and it should be understood that they will naturally come under the technical scope of the present disclosure.

Further, the effects described in this specification are merely illustrative or mentioned effects, and are not limitative. That is, with or in the place of the above effects, the technology according to the present disclosure may achieve other effects that are clear to those skilled in the art on the basis of the description of this specification.

In addition, a program for causing the hardware such as a processor, a ROM, and a RAM built in the computer to perform the same functions as those of the automatic cropping device 20, the detection device 30, and the detection device 40 may be created. Moreover, a computer-readable non-transient recording medium on which the program is recorded may also be provided.

For example, the steps related to the processing of each device in the present specification may not necessarily be executed chronically in the order described in the flowcharts. For example, the steps related to the processing of the automatic cropping device 20, the detection device 30, and the detection device 40 may be processed in the order different from the order described in the flowcharts, or may also be processed in parallel.

Note that, the following configurations also fall within the technical scope of the present disclosure.

(1)

An information processing method for causing a processor to execute:
  automatically cropping a region including an object from a material image to generate an automatically cropped image; and
  performing learning related to detection of the object on the basis of the automatically cropped image, wherein
  the generating of the automatically cropped image further includes generating the automatically cropped image using an automatic cropper generated by learning based on manually cropped images obtained by manually cropping a region including the object from the material image.

(2)

The information processing method according to (1), wherein
  the automatic cropper is generated on the basis of learned parameters obtained as a result of learning by a neural network to which the manually cropped images are input.

(3)

The information processing method according to (2), wherein
  the generating of the automatically cropped image further includes: identifying an interim region including the object in the material image; and automatically cropping a detailed region including the object from the interim region.

(4)

The information processing method according to (3), wherein
  the identifying of the interim region and the automatically cropping of the detailed region are executed using different neural networks.

(5)

The information processing method according to (3) or (4), wherein
  the identifying of the interim region involves identifying the interim region by a high-speed object detection method using deep learning.

(6)

The information processing method according to (4) or (5), wherein
  the automatically cropping of the detailed region involves executing automatic cropping of the detailed region using the automatic cropper to generate the automatically cropped image.

(7)

The information processing method according to any one of (1) to (6), wherein
  the learning involves performing learning on the basis of the automatically cropped image adopted on the basis of a distance between the object and a photographing device during photographing of the material image.

(8)

The information processing method according to (7), wherein
  the generating of the automatically cropped image involves adopting the automatically cropped image related to the material image as learning data only when the distance between the object and the photographing device is within a predetermined range.

(9)

The information processing method according to (7), wherein
  the generating of the automatically cropped image involves automatically cropping a region including the object from the material image to generate the automatically cropped image only when the distance between the object and the photographing device is within a predetermined range.

(10)

The information processing method according to any one of (7) to (9), wherein
  the material image includes an RGB image, and
  the generating of the automatically cropped image involves making determination related to adoption of the automatically cropped image on the basis of a distance image photographed simultaneously with the RGB image.

(11)

The information processing method according to any one of (1) to (10), wherein
  the object includes an obstacle during movement of a moving object.

(12)

A program for causing a computer to function as an information processing device comprising:
  an automatic cropping unit that automatically crops a region including an object from a material image to generate an automatically cropped image; and a learning unit that performs learning related to detection of the object on the basis of the automatically cropped image, wherein
  the automatic cropping unit generates the automatically cropped image using an automatic cropper generated by learning based on manually cropped images obtained by manually cropping a region including the object from the material image.

(13)

An information processing system comprising:
a photographing unit that photographs a material image including an object; an automatic cropping unit that automatically crops a region including the object from the material image to generate an automatically cropped image;
a learning unit that performs learning related to detection of the object on the basis of the automatically cropped image; and
a detection unit that detects the object on the basis of the result of learning by the learning unit, wherein
the automatic cropping unit generates the automatically cropped image using an automatic cropper generated by learning based on manually cropped images obtained by manually cropping a region including the object from the material image.

REFERENCE SIGNS LIST

10 Manual cropping device
20 Automatic cropping device
210 Image supply unit
220 Automatic cropping unit
230 Image storage unit
240 Learning unit
30 Detection device
310 Photographing unit
320 Detection unit
330 Operation control unit
340 Operating unit

The invention claimed is:

1. An information processing method comprising:
automatically cropping a region including an object, from a material image to generate an automatically cropped image; and
performing learning related to detection of the object on the basis of the automatically cropped image, wherein
generating the automatically cropped image uses an automatic cropper generated by learning based on manually cropped images obtained by manually cropping from a set of learning material images,
the automatic cropper is generated on the basis of learned parameters obtained as a result of learning by a neural network to which the manually cropped images are input, and
generating the automatically cropped image includes identifying an interim region including the object in the material image and automatically cropping a detailed region including the object from the interim region.

2. The information processing method according to claim 1, wherein the identifying of the interim region and the automatically cropping of the detailed region are executed using different neural networks.

3. The information processing method according to claim 1, wherein the identifying of the interim region involves identifying the interim region by a high-speed object detection method using deep learning.

4. The information processing method according to claim 2, wherein the automatically cropping of the detailed region involves executing automatic cropping of the detailed region using the automatic cropper to generate the automatically cropped image.

5. The information processing method according to claim 1, wherein the object includes an obstacle during movement of a moving object.

6. An information processing method comprising:
automatically cropping a region including an object, from a material image to generate an automatically cropped image; and
performing learning related to detection of the object on the basis of the automatically cropped image, wherein
generating the automatically cropped image uses an automatic cropper generated by learning based on manually cropped images obtained by manually cropping from a set of learning material images, wherein
the learning involves performing learning on the basis of the automatically cropped image adopted on the basis of a distance between the object and an imager during imaging of the material image.

7. The information processing method according to claim 6, wherein the generating of the automatically cropped image involves adopting the automatically cropped image related to the material image as learning data only when the distance between the object and the image is within a predetermined range.

8. The information processing method according to claim 6, wherein the generating of the automatically cropped image involves automatically cropping a region including the object from the material image to generate the automatically cropped image only when the distance between the object and the imager is within a predetermined range.

9. The information processing method according to claim 6, wherein the material image includes an RGB image, and the generating of the automatically cropped image involves making determination related to adoption of the automatically cropped image on the basis of a distance image that is imaged simultaneously with the RGB image.

10. A non-transitory computer readable medium storing a program, the program being executable by a processor to perform operations comprising:
automatically cropping a region including an object, from a material image to generate an automatically cropped image; and
performing learning related to detection of the object on the basis of the automatically cropped image, wherein
generating the automatically cropped image uses an automatic cropper generated by learning based on manually cropped images obtained by manually cropping from a set of learning material images,
the automatic cropper is generated on the basis of learned parameters obtained as a result of learning by a neural network to which the manually cropped images are input, and
generating the automatically cropped image includes identifying an interim region including the object in the material image and automatically cropping a detailed region including the object from the interim region.

11. The non-transitory computer readable medium according to claim 10, wherein the identifying of the interim region and the automatically cropping of the detailed region are executed using different neural networks.

12. The non-transitory computer readable medium according to claim 11 wherein the identifying of the interim region involves identifying the interim region by a high-speed object detection method using deep learning.

13. The non-transitory computer readable medium according to claim 12, wherein the automatically cropping of the detailed region involves executing automatic cropping of the detailed region using the automatic cropper to generate the automatically cropped image.

14. The non-transitory computer readable medium according to claim 10, wherein the object includes an obstacle during movement of a moving object.

15. A non-transitory computer readable medium storing a program, the program being executable by a processor to perform operations comprising:
    automatically cropping a region including an object, from a material image to generate an automatically cropped image; and
    performing learning related to detection of the object on the basis of the automatically cropped image, wherein
    generating the automatically cropped image uses an automatic cropper generated by learning based on manually cropped images obtained by manually cropping from a set of learning material images, wherein
    the learning involves performing learning on the basis of the automatically cropped image adopted on the basis of a distance between the object and an imager during imaging of the material image.

16. The non-transitory computer readable medium according to claim 15, wherein the generating of the automatically cropped image involves adopting the automatically cropped image related to the material image as learning data only when the distance between the object and the imager is within a predetermined range.

17. The non-transitory computer readable medium according to claim 15, wherein the generating of the automatically cropped image involves automatically cropping a region including the object from the material image to generate the automatically cropped image only when the distance between the object and the imager is within a predetermined range.

18. The non-transitory computer readable medium according to claim 15, wherein the material image includes an RGB image, and the generating of the automatically cropped image involves making determination related to adoption of the automatically cropped image on the basis of a distance image that is imaged simultaneously with the RGB image.

19. An apparatus comprising:
a memory storing a program, and
a processor configured to execute the program to perform operations comprising:
automatically cropping a region including an object, from a material image to generate an automatically cropped image; and
performing learning related to detection of the object on the basis of the automatically cropped image, wherein
generating the automatically cropped image uses an automatic cropper generated by learning based on manually cropped images obtained by manually cropping from a set of learning material images,
the automatic cropper is generated on the basis of learned parameters obtained as a result of learning by a neural network to which the manually cropped images are input, and
generating the automatically cropped image includes identifying an interim region including the object in the material image and automatically cropping a detailed region including the object from the interim region.

20. An apparatus comprising:
a memory storing program, and
a processor configured to execute the program to perform operations comprising:
automatically cropping a region including an object, from a material image to generate an automatically cropped image; and
performing learning related to detection of the object on the basis of the automatically cropped image, wherein
generating the automatically cropped image uses an automatic cropper generated by learning based on manually cropped images obtained by manually cropping from a set of learning material images, wherein
the learning involves performing learning on the basis of the automatically cropped image adopted on the basis of a distance between the object and an imager during imaging of the material image.

\* \* \* \* \*